United States Patent
Nakada et al.

(10) Patent No.: US 8,761,605 B2
(45) Date of Patent: Jun. 24, 2014

(54) COMMUNICATION DATA TRANSMISSION EQUIPMENT, A COMMUNICATION DATA TRANSMISSION SYSTEM, A COMMUNICATION DATA TRANSMISSION METHOD AND A COMMUNICATION DATA TRANSMISSION PROGRAM

(75) Inventors: Tatsuhiro Nakada, Tokyo (JP); Yohei Hasegawa, Tokyo (JP)

(73) Assignee: NEC Corporation, Tokyo (JP)

( * ) Notice: Subject to any disclaimer, the term of this patent is extended or adjusted under 35 U.S.C. 154(b) by 149 days.

(21) Appl. No.: 13/497,422

(22) PCT Filed: Sep. 21, 2010

(86) PCT No.: PCT/JP2010/066751
§ 371 (c)(1),
(2), (4) Date: Mar. 21, 2012

(87) PCT Pub. No.: WO2011/037245
PCT Pub. Date: Mar. 31, 2011

(65) Prior Publication Data
US 2012/0230671 A1    Sep. 13, 2012

(30) Foreign Application Priority Data
Sep. 24, 2009   (JP) .................................. 2009-218752

(51) Int. Cl.
*H04B 17/00* (2006.01)
*H04B 10/00* (2013.01)

(52) U.S. Cl.
USPC .............................. 398/139; 398/25; 398/158

(58) Field of Classification Search
USPC .......... 398/9, 66–68, 70–72, 58, 25, 139, 158
See application file for complete search history.

(56) References Cited

U.S. PATENT DOCUMENTS

| 5,519,699 A | 5/1996 | Ohsawa |
| 8,156,235 B2 * | 4/2012 | Barreto et al. ................. 709/231 |
| 2009/0327844 A1 * | 12/2009 | Suneya .......................... 714/776 |

FOREIGN PATENT DOCUMENTS

| JP | 3-131143 A | 6/1991 |
| JP | 7-177177 A | 7/1995 |
| JP | 7-250100 A | 9/1995 |
| JP | 9-162929 A | 6/1997 |
| JP | 2001-160824 A | 6/2001 |
| JP | 2003-069472 A | 3/2003 |
| JP | 2003-258880 A | 9/2003 |
| JP | 2005-136684 A | 5/2005 |

* cited by examiner

*Primary Examiner* — Dalzid Singh
(74) *Attorney, Agent, or Firm* — Sughrue Mion, PLLC (57) ABSTRACT

Even in a network system including a transmission line of which dominant cause of delay is a transmission line delay, controlling communication speed of the network system as a whole efficiently and suppressing the delay is made possible. A communication data transmission equipment which performs sending and receiving of data with opposite transmission equipment connected via a long-distance optical fiber circuit, includes a data sending and receiving unit which, after sending a connection establishment request to the opposite transmission equipment, sends data before arrival of an acknowledgement reply, a circuit state monitoring unit which estimates data loss occurrence probability from data loss occurrence state in sending and receiving of data with the opposite transmission equipment or acquires data loss occurrence probability which the opposite transmission equipment estimated and a unit performing controls which, until the data loss occurrence probability exceeds a predetermined value, do not restrict a data size per each sending of data, and in case the data loss occurrence probability exceeds the predetermined value, reduce the data size per each sending of data according to an increase of the data loss occurrence probability.

37 Claims, 10 Drawing Sheets

COMMUNICATION DATA TRANSMISSION EQUIPMENT, A COMMUNICATION DATA TRANSMISSION SYSTEM, A COMMUNICATION DATA TRANSMISSION METHOD AND A COMMUNICATION DATA TRANSMISSION PROGRAM

TECHNICAL FIELD

The present invention relates to a communication data transmission system and, in particular, relates to a communication data transmission system which is used for data transmission via a long distance transmission line such as a marine cable system.

BACKGROUND ART

TCP/IP (Transmission Control Protocol/Internet Protocol) is widely used as a connection oriented communication protocol between terminals. There is a problem in a network with large latency that throughput declines due to a congestion control function of TCP/IP.

That is, throughput of communication based on TCP/IP depends on round trip latency (Round Trip Time, hereinafter referred to as 'RTT') and a packet loss rate in a network between a sending side of TCP and a receiving side of TCP, and in order to improve the throughput of the TCP/IP communication, reduction of the packet loss rate is indispensable. However, in a circuit with large RTT between terminals, depending on a congestion control method of TCP/IP, it could be a primary factor by itself to deteriorate the throughput of communication.

In general, in order to perform high-speed communication via a circuit with a large delay, TCP sends a large amount of data continuously, and a sending side stores data sent in a protocol stack temporarily until an acknowledgement reply (ACK: ACKnowledge) is received from a receiving side. By this method, it is possible to improve the throughput of communication while guaranteeing integrity of the communication data. In particular in recent years, in order to improve the throughput of TCP/IP, several sending data size control algorithms with names such as TCP/Tahoe, TCP/Reno and TCP/Sack are proposed. Moreover, recently, an algorithm for long-distance high-speed transmission called High Speed TCP is proposed.

However, for a communication between terminals in the long distance, it is generally performed to communicate using a composite communication system which is composed by connecting a plurality of networks mutually. In such a case, because each network of which the communication system is composed is usually completely different in features and characteristics according to its communication distance or communication speed, the communication protocol for throughput improvement mentioned above cannot necessarily exhibit the communication performance including communication rate control between terminals. In other words, because a communication protocol has an aptitude depending on characteristics of a network, in case of a composite system of different networks, there was a problem that the throughput of the whole system could not be controlled efficiently.

An example of a technology to cope with such a problem is disclosed in Japanese Patent Application Laid-Open No. 1995-250100 (hereinafter referred to as 'patent document 1'). In the technology described in the patent document 1, in case a plurality of LANs (Local Area Network) are connected via a wide area network, independent TCP/IP protocols are used on a LAN side and a wide area network side respectively, and both of them are converted mutually at a part of connection equipment between the LAN and the wide area network. Also, flow control of the protocol on the LAN side is terminated at the part of the connection equipment, and a parameter for flow control of the protocol on the wide area network side is set to an optimum value with regard to a transmission rate or a transmission delay of the wide area network. It is claimed that, with this technology, the throughput of the system as a whole can be held in a good state.

SUMMARY OF INVENTION

Technical Problem

However, by a communication technology which performs protocol conversion described in the patent document 1 mentioned above, in case it is applied to a network system via a communication circuit with a very long communication distance such as a marine cable system, it is impossible to perform communication control efficiently.

That is, in a long-distance transmission system, in particular, in a marine cable system, since transmission distance is quite long compared with a land network, a transmission line delay itself by an optical fiber or relay unit is very large. On the other hand, a marine cable system, because signal transmission is generally performed with a powerful error correction code such as FEC (Forward Error Correction), has characteristics much different from a usual land network system that it has very few signal errors.

Here, in a protocol control at a TCP layer, it is not possible to distinguish whether the cause of loss or delay of a TCP/IP frame is produced by congestion or due to latency which the transmission line has. For this reason, in a long-distance transmission system segment such as a marine cable, even though a dominant cause of delay is a transmission line delay and a signal errors occur only rarely as mentioned above, controls corresponding to a packet loss will always continue to be executed. That is, there was a problem that, even though the cause of the delay is in most cases simply a transmission line delay, as far as delay occurs, TCP cannot set a window size of data transfer large, and the throughput cannot be improved efficiently. Also, there was a problem that, in order to guarantee integrity of communication data, it was always necessary to store temporarily enormous amount of data in the protocol stack, and it was very inefficient to execute communication control.

The object of the present invention is to provide communication data transmission equipment, a communication data transmission system, a communication data transmission method and a communication data transmission program which solve the problems mentioned above; even a network system including a segment where main cause of delay is a transmission line delay, can perform a communication control by efficient processing and can improve the throughput.

Solution to Problem

A communication data transmission equipment of the present invention is a communication data transmission equipment which performs sending and receiving of data with opposite transmission equipment connected via a long-distance optical fiber circuit, including a data sending and receiving means which, after sending a connection establishment request to the opposite transmission equipment, sends data before arrival of an acknowledgement reply, a circuit state monitoring means which estimates data loss occurrence probability from data loss occurrence state in sending and receiving of data with the opposite transmission equipment or acquires data loss occurrence probability which the opposite transmission equipment estimated and a means performing controls which, until the data loss occurrence probability exceeds a predetermined value, do not restrict a data size per each sending of data, and in case the data loss occurrence probability exceeds the predetermined value, reduce the data size per each sending of data according to an increase of the data loss occurrence probability.

A communication data transmission method of the present invention is a communication data transmission method of communication data transmission equipment which performs sending and receiving of data via a long-distance optical fiber circuit, and includes the steps of sending data before arrival of an acknowledgement reply, after sending a connection establishment request to opposite transmission equipment, acquiring data loss occurrence probability by estimating from data loss occurrence state in sending and receiving of data or by obtaining from the opposite transmission equipment and performing control not to restrict a data size per each sending of data until the data loss occurrence probability exceeds a predetermined value, and to reduce the data size per each sending of data according to an increase of the data loss occurrence probability in case the data loss occurrence probability exceeds the predetermined value.

A program recording medium of the present invention is a program recording medium recording a communication data transmission program for a communication data transmission equipment which sends and receives data to and from opposite transmission equipment connected via a long-distance optical fiber circuit, and the program includes the procedures of sending data before arrival of an acknowledgement reply procedure, after sending a connection establishment request to the opposite transmission equipment acquiring data loss occurrence probability by estimating from data loss occurrence state in sending and receiving of data or by obtaining from the opposite transmission equipment and performing control not to restrict a data size per each sending of data until the data loss occurrence probability exceeds a predetermined value, and to reduce the data size per each sending of data according to an increase of the data loss occurrence probability in case the data loss occurrence probability exceeds the predetermined value.

Advantageous Effects of Invention

According to the present invention, even a network system including a segment where dominant cause of delay is a transmission line delay, can perform a communication control by efficient processing and can improve the throughput.

DESCRIPTION OF EMBODIMENTS

Next, one embodiment of the present invention will be described with reference to drawings.

Figure 1:
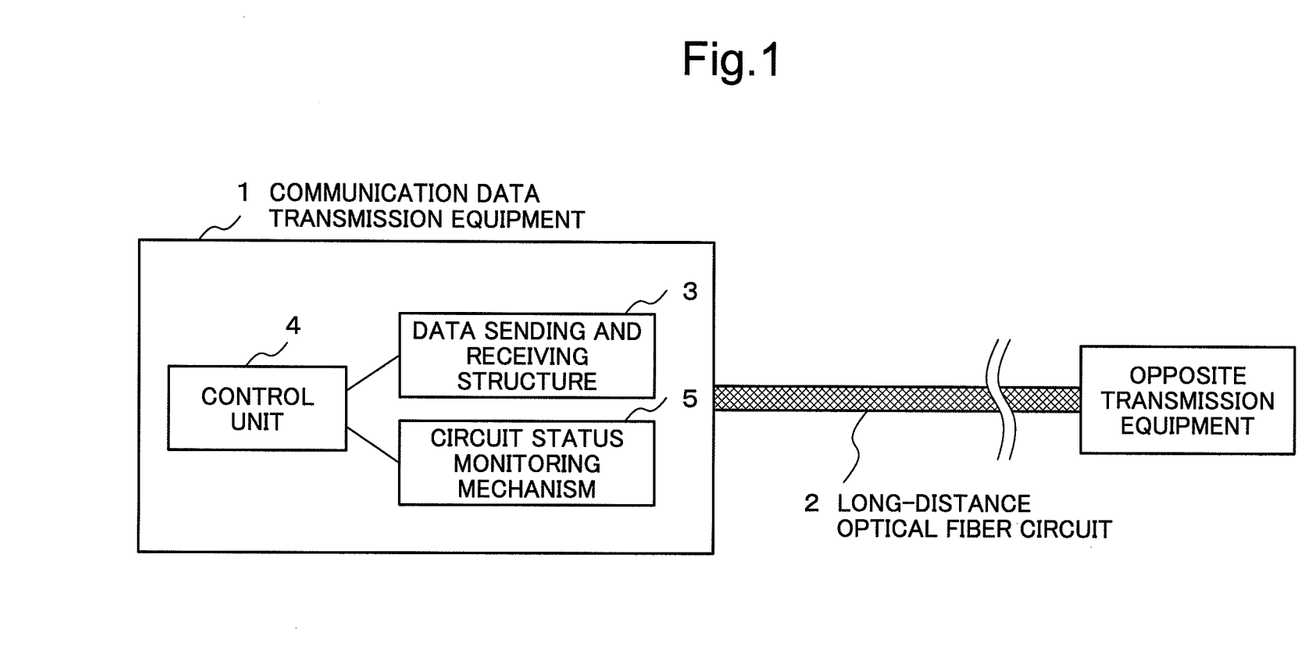
FIG. 1 is a block diagram showing communication data transmission equipment of the embodiment of the present invention.

FIG. 1 is a block diagram showing a communication system which performs data communication via a long-distance optical fiber circuit using communication data transmission equipment of the present invention. A long-distance optical fiber circuit 2 is connected to communication data transmission equipment 1, and opposite transmission equipment is connected on the opposite side. The communication data transmission equipment 1 includes a data sending and receiving mechanism 3 to exchange communication data with the opposite transmission equipment. A control unit 4 controls communication for the data sending and receiving mechanism 3 such that, after a connection establishment request (SYN: SYNchronize) is sent to the communication data transmission equipment 2 of a sending destination and before an acknowledgement reply (ACK) arrives, it is possible to send data, and also sets data size per each sending of data. A circuit state monitoring mechanism 5 estimates data loss occurrence probability from data loss occurrence state during sending and receiving of data and also acquires data loss occurrence probability which the opposite transmission equipment estimates. The control unit 4 does not restrict the data size per each sending of data until a value of data loss occurrence probability exceeds a predetermined value. On the other hand, in case the data loss occurrence probability exceeds the predetermined value, and when the data loss occurrence probability becomes high, corresponding to that, controls to make the data size per each sending of data small are performed.

According to this embodiment, not by monitoring data loss occurrence such as communication control by usual TCP, but by detecting data loss occurrence probability in the long-distance optical fiber circuit, states of the circuit are monitored. And, in case state of the circuit is good and it can be expected that a data loss will not occur, the data size per each sending of data is not restricted, and without waiting for an arrival of ACK from a destination, data is sent continuously. That is, in a circuit like a marine cable, in which even if there exists delay, whose data loss occurrence probability is in most cases sufficiently small, it is possible to avoid waste to restrict the data size per each sending of data simply because there exists delay and possible to improve the throughput substantially.

Figure 2:
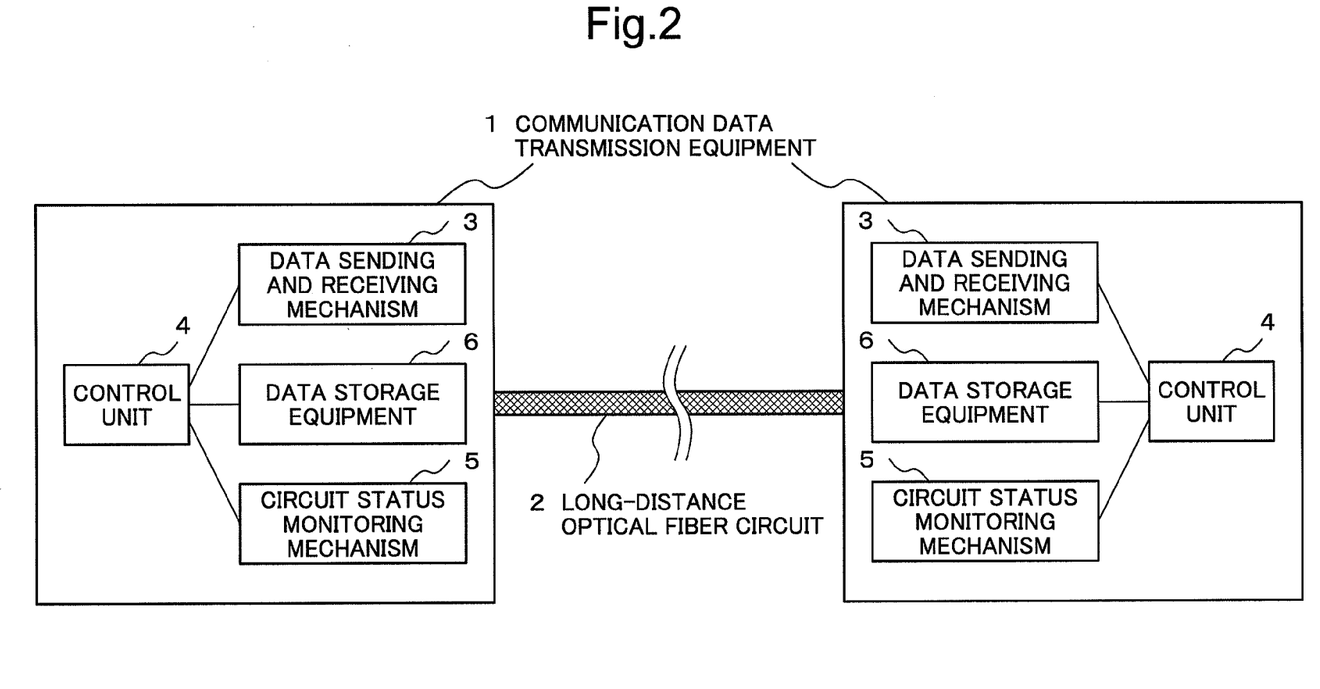
FIG. 2 is a block diagram showing a case when a temporary storage means for sending data is installed in a communication data transmission system of the present invention.

FIG. 2 is a block diagram showing the second embodiment of the present invention. This embodiment connects the communication data transmission equipment 1 of the first embodiment mentioned above on the side of both ends of the long-distance optical fiber circuit and sends and receives data mutually. Also, the communication data transmission equipment 1 further includes data storage equipment 6 for storing temporarily the contents of data which is already sent. The control unit 4 controls data storage operation and does not store the contents of data sent in the data storage equipment 6 until a value of data loss occurrence probability exceeds a predetermined value. On the other hand, in case the data loss occurrence probability exceeds the predetermined value, the contents of data sent are stored in the data storage equipment 6 until ACK arrives.

In general, in a circuit of which circuit delay is large, in order to be prepared for data loss occurrence at the worst and to raise the throughput, it is necessary to store temporarily a large amount of sending data. However, according to this embodiment, in case it is expected that the state is good and a data loss does not occur, storing sending data temporarily is not performed. For this reason, it becomes unnecessary to secure a large amount of temporal data storage area.

Figure 3:
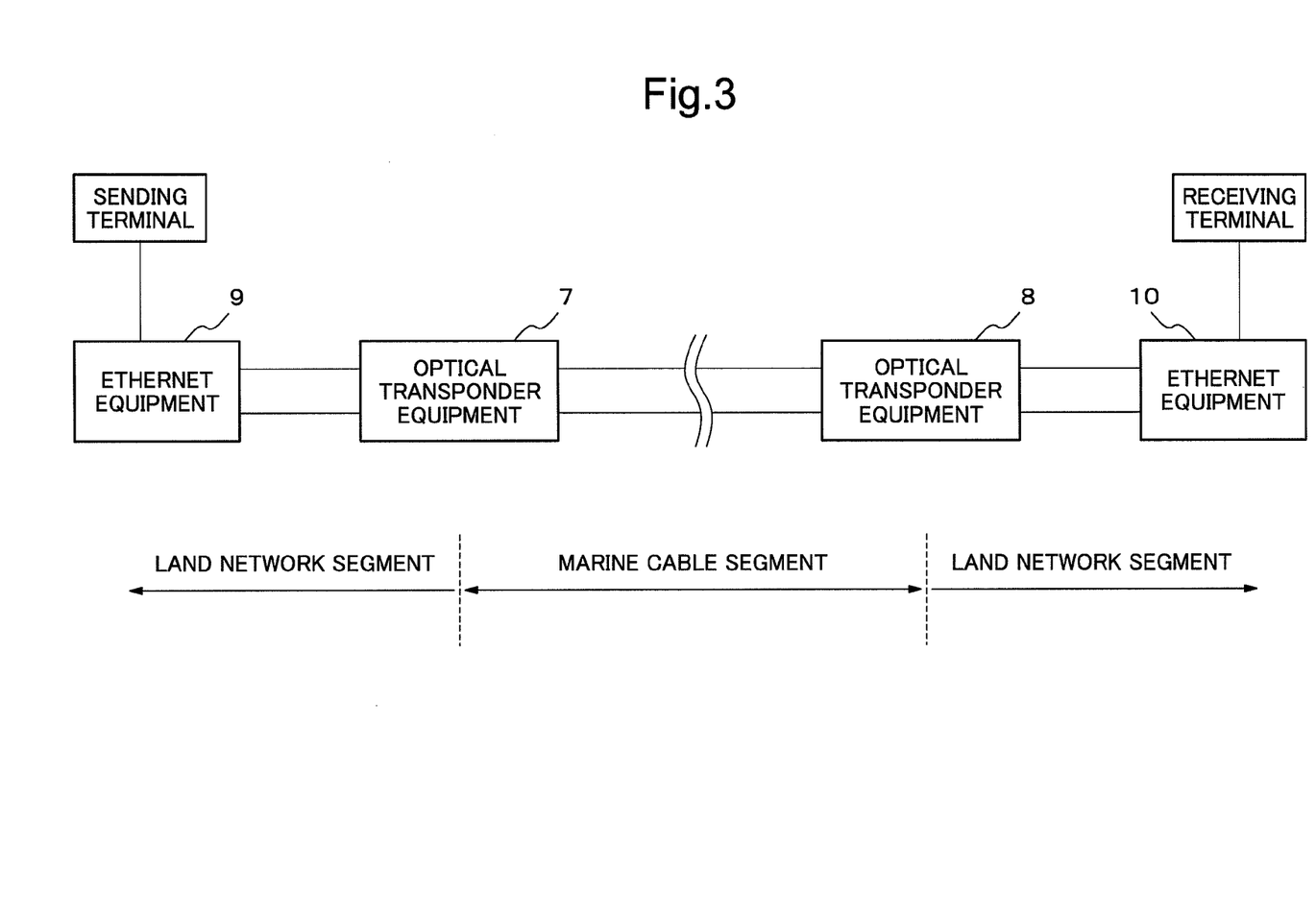
FIG. 3 is a block diagram in case a communication data transmission system of the present invention is applied to a communication network system including a marine cable circuit.

Next, the third embodiment of the present invention will be described with reference to drawings. FIG. 3 is a block diagram showing an exemplary configuration in case the present invention is applied to a case in which data communication is performed between communication terminals belonging to different land network systems respectively and via a marine cable system as a long-distance optical fiber circuit. In FIG. 3, communication between a sending terminal and a receiving terminal is performed by TCP. However, a protocol conversion mechanism is included in optical transponder equipment 7 and 8 which are communication data transmission equipment. And the protocol conversion mechanism converts protocol in respective segments of a land network segment on a sending terminal side, a marine cable segment and a land network segment on a receiving terminal side at the time of relaying of data communication. Ethernet (registered trademark) equipments 9 and 10 are communication equipments such as a router or a bridge in a general land network system. Further, in a marine cable segment, there may exist an optical fiber amplifier which performs signal amplification.

Figure 4:
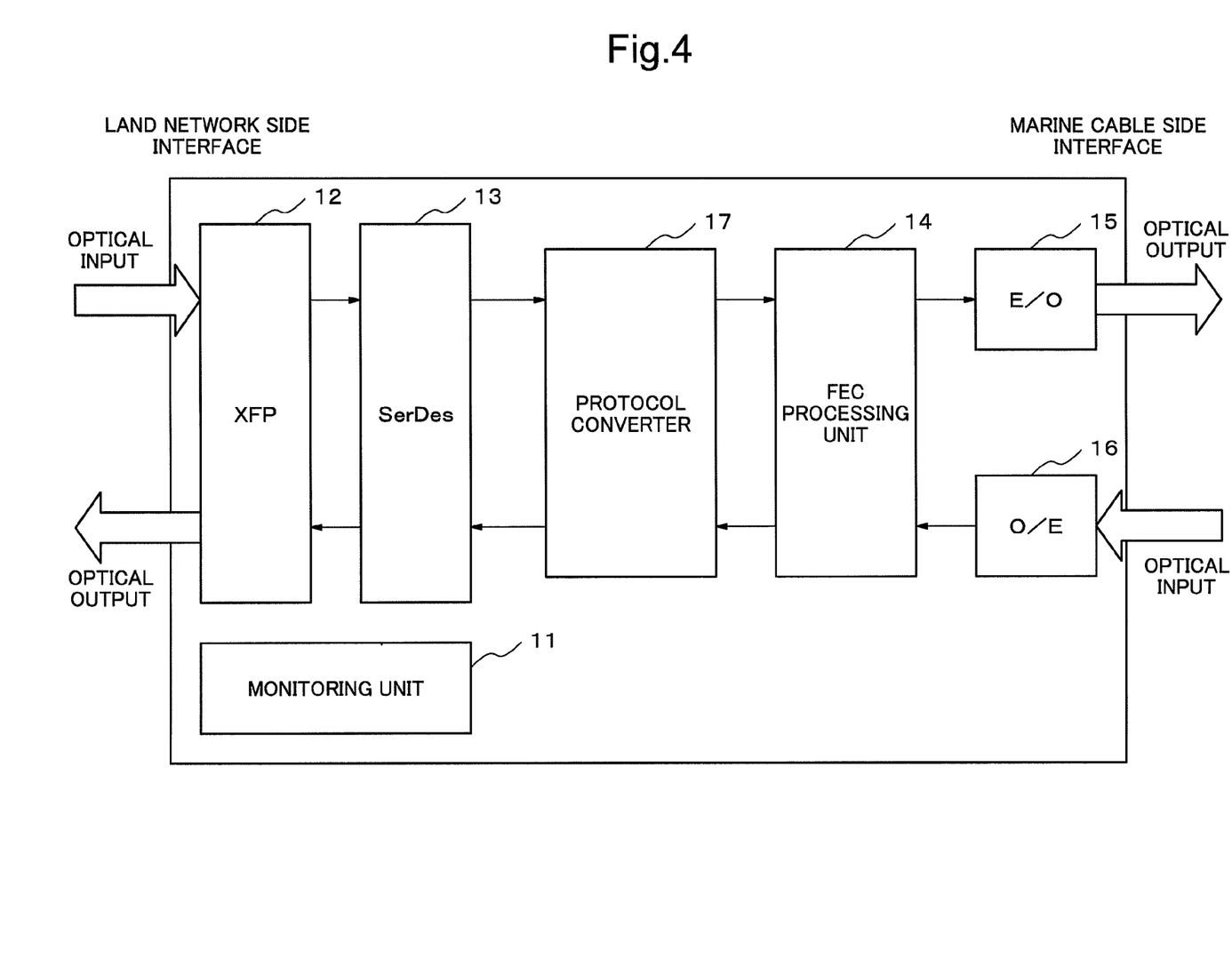
FIG. 4 is a block diagram showing contents of operation in optical transponder equipment using the present invention.

FIG. 4 is a block diagram showing a structure of the optical transponder equipment 7 in FIG. 3. Further, the structure is also the same for the optical transponder equipment 8. In FIG. 4, a monitoring unit 11 performs monitoring of warning detection state of the whole transponder equipment and warning transfer control. XFP 12 is a 10 Gigabit Small Form-factor Pluggable transceiver and accommodates a 10 G Ethernet signal as a land network side interface. SerDes 13 is a SERializer/DESerializer, and converts a 10 G serial signal from the XFP 12 into a parallel signal. Also, a 10 G parallel signal inputted from the marine cable side direction is converted into serial and sent to the XFP 12. An FEC processing unit 14 includes an FEC (Forward Error Correction) coding/decoding function, performs FEC coding of a 10 G Ethernet signal inputted from the land network side and sends it to the marine cable side. Also, it decodes an FEC code signal inputted from the marine cable side, and sends the decoded 10 G Ethernet signal to the land network side. An E/O converter 15 performs electric-optical conversion to an electric signal inputted from the FEC processing unit 14, and outputs it as an optical signal. An O/E converter 16 performs optical-electric conversion to an optical signal inputted from outside, and send it to the FEC processing unit 14. A protocol converter 17 is a part which performs controls of processing required at the time of data relay including conversion of a communication protocol between a land network segment and a marine cable segment, and includes a mechanism to perform a communication control according to a circuit status of the marine cable segment and a mechanism to store contents of sending data temporarily. That is, in the protocol converter 17, a control parameter of a TCP/IP signal received from the land network side interface is changed to a parameter suitable for the marine cable system (hereinafter, this TCP/IP frame is described as an extended TCP/IP frame). Also, the extended TCP/IP frame received from the marine cable side interface is converted into a usual TCP/IP frame, and is outputted from the land network side interface. By arranging this optical transponder equipment on both ends of the ocean cable system which is a wavelength-multiplexed transmission system, it becomes possible to communicate in the marine cable segment with large latency using the extended TCP/IP frame.

A TCP/IP frame received from the land network side interface is converted into an extended TCP/IP frame adjusted to transmission line characteristics of the marine cable system and outputted from the marine cable side interface by the protocol converter 17. On the other hand, an extended TCP/IP frame received from the marine cable side interface is converted into a usual TCP/IP frame and outputted from the land network side interface.

By performing conversion control of TCP/IP by the protocol converter 17, changing operation of a TCP/IP frame by the protocol converter 17 will be hidden from equipment of a land network system connected to the land network side interface, and for external equipment, it operates as communication by conventional TCP/IP.

Concrete contents of data processing in the optical transponder equipment mentioned above are as follow. An Ethernet frame inputted from the land network side interface is, after going through the XFP 12 and the SerDes 13, inputted to the protocol converter 17. In the protocol converter 17, a packet header stored in the frame is referred, a TCP/IP header is recognized, receiving processing of TCP/IP is performed, and data stored in the packet is restored. Also, in the protocol converter 17, sending processing of TCP/IP is performed to the data concerned, and the frame is sent to the FEC processing unit 14. The FEC processing unit 14 performs FEC coding of the frame, and sends it to the E/O converter 15. The coded frame is, after E/O conversion is performed, outputted from the marine cable side interface.

On the other hand, the coded frame inputted from the marine cable side interface is, after O/E conversion is performed by the O/E converter 16, sent to the FEC processing unit 14. The FEC processing unit 14 performs FEC decoding of the coded frame and sends the frame to the protocol converter 17. In the protocol converter 17, the packet header stored in the frame is referred, the TCP/IP header is recognized, receiving processing of TCP/IP is performed, and the data stored in the packet is restored. In the protocol converter 17, sending processing of TCP/IP is performed to the data concerned, and the Ethernet frame is outputted to the SerDes 13. The Ethernet frame is outputted from the land network side interface via the SerDes 13 and the XFP 12.

Further, in the optical transponder equipment 8 on the receiving side, when the received FEC code is decoded, a bit error rate of transmission in the marine cable segment is detected, and the value is notified to the optical transponder equipment 7 on the sending side. In case the bit error rate is not sufficiently small, the protocol converter 17 of the optical transponder equipment 7 which is notified the bit error rate judges that the transmission characteristics of the marine cable segment are not good, prepared for occurrence of a packet loss, stores sending data temporarily until ACK arrival, and also restricts the window size of sending of data. On the other hand, in case the bit error rate is sufficiently small, it judges that the transmission characteristics of the marine cable segment are good and a packet loss may not occur. And, in sending processing of TCP, data is not stored for re-sending of data, and also, without waiting for an ACK arrival for the data sent, data is sent continuously. Also, the window size is set to maximum according to the receiving capability of the opposite side equipment.

According to this embodiment, the transmission characteristics of the marine cable segment are being monitored by referring to the bit error rate, and a communication control according to the occurrence probability of a packet loss is performed. For this reason, it becomes unnecessary to secure a large amount of storage area for storing data, and also the throughput can be improved substantially by efficient data transfer within the marine cable segment.

Further, packet sequence of data relay in the optical transponder equipment described above will be described with reference to a sequence diagram.

Figure 5:
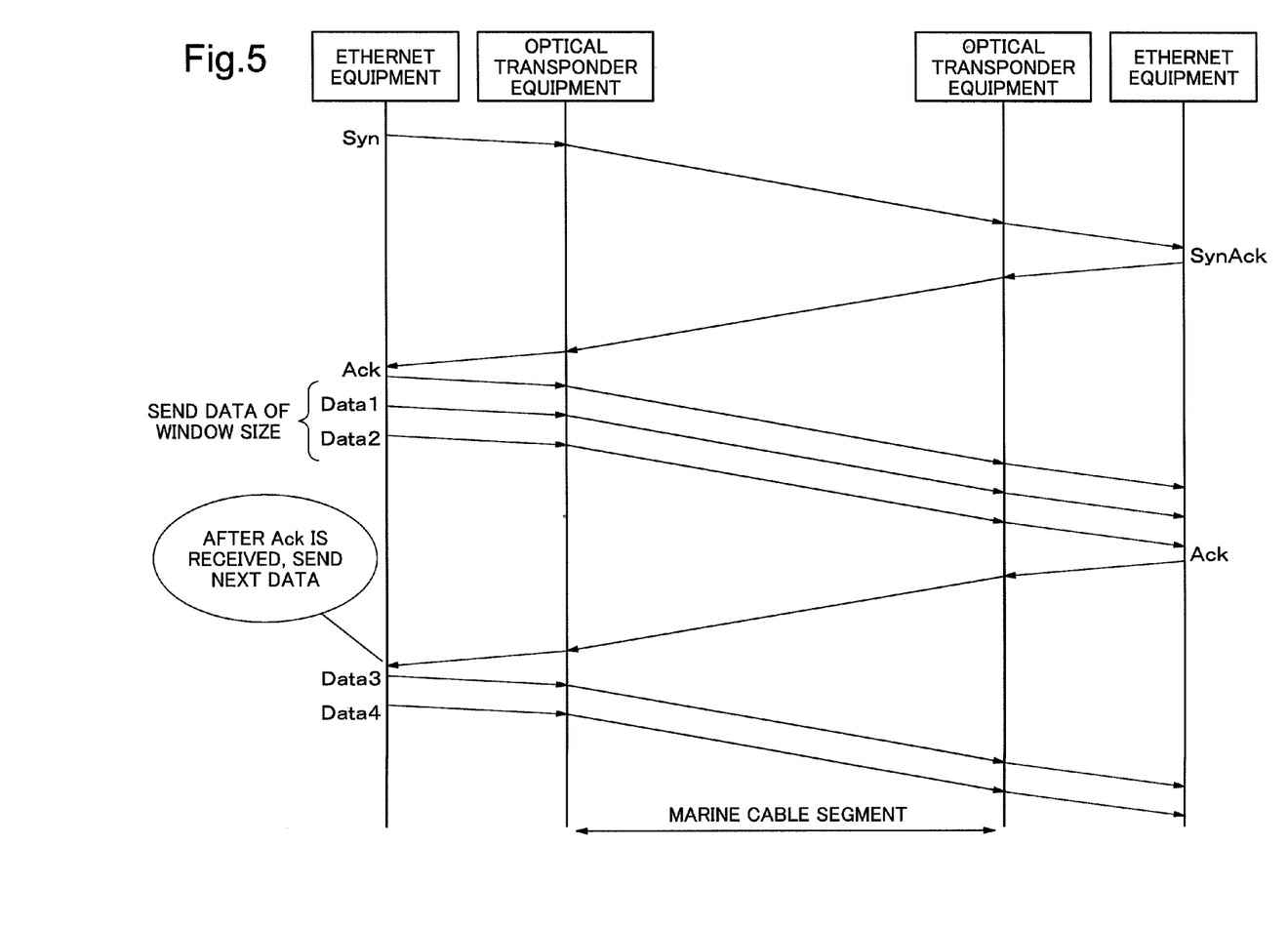
FIG. 5 is a figure showing an example of a packet sequence of general TCP/IP communication.

FIG. 5 is a packet sequence diagram showing, for comparison, an example when communication is performed using a general TCP/IP protocol on the marine cable system with large latency. In the conventional TCP/IP, after sending data with the window size once, ACK arrival from opposite equipment is waited for and next sending of data is resumed. Therefore, in a transmission line with large latency, throughput declines substantially.

Figure 6:
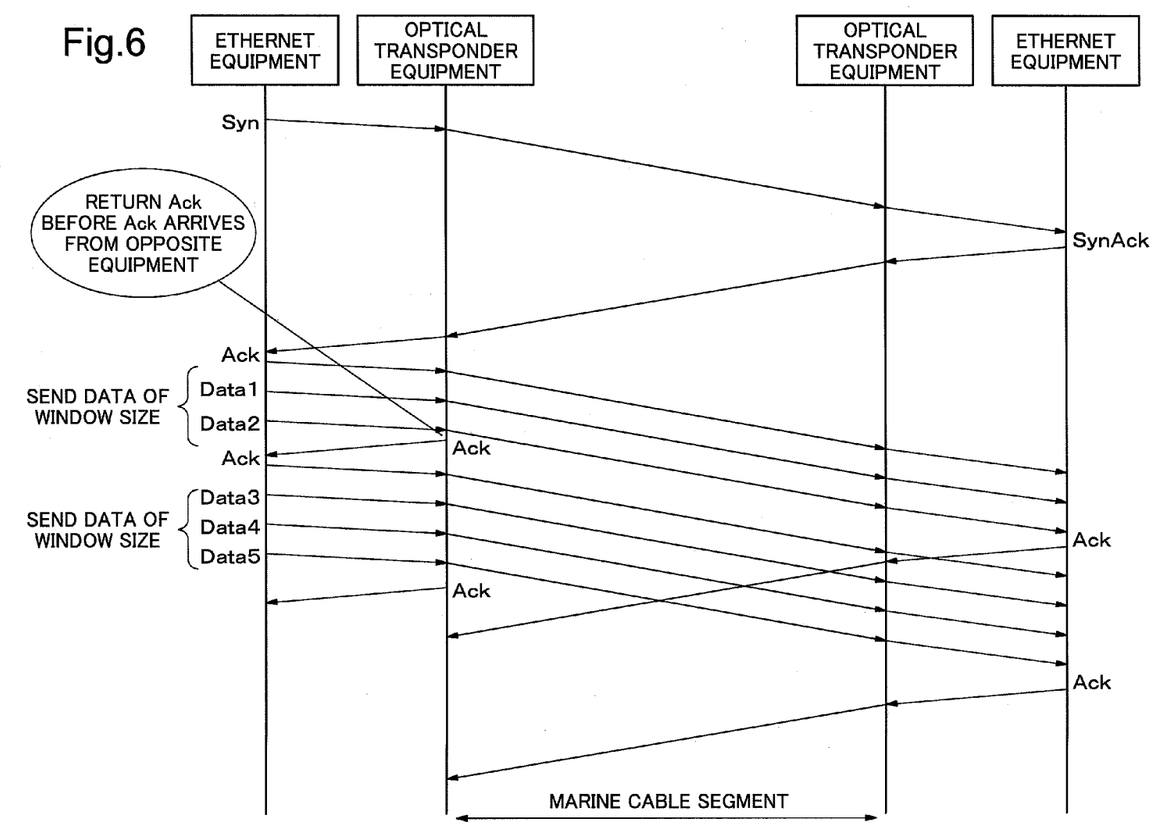
FIG. 6 is a figure showing an example of a packet sequence of TCP/IP communication in the embodiment of the present invention.

In contrast, FIG. 6 indicates a case where, optical transponder equipment, considering latency of a transmission line, returns ACK to the land network side for SYN from a land network side, not waiting for ACK arrival from the optical transponder equipment on the opposite side. And, the extended TCP/IP is being adjusted so that data transfer from the land network side may be continued. Whereas next data is being sent after ACK arrival from the opposite equipment in the conventional TCP/IP control, as shown in FIG. 6, by the optical transponder equipment returning ACK to the land network side before ACK arrival from the opposite equipment, it becomes possible to prompt sending of data continuously. Accordingly, the throughput of the marine cable system with large latency can be improved.

Figure 7:
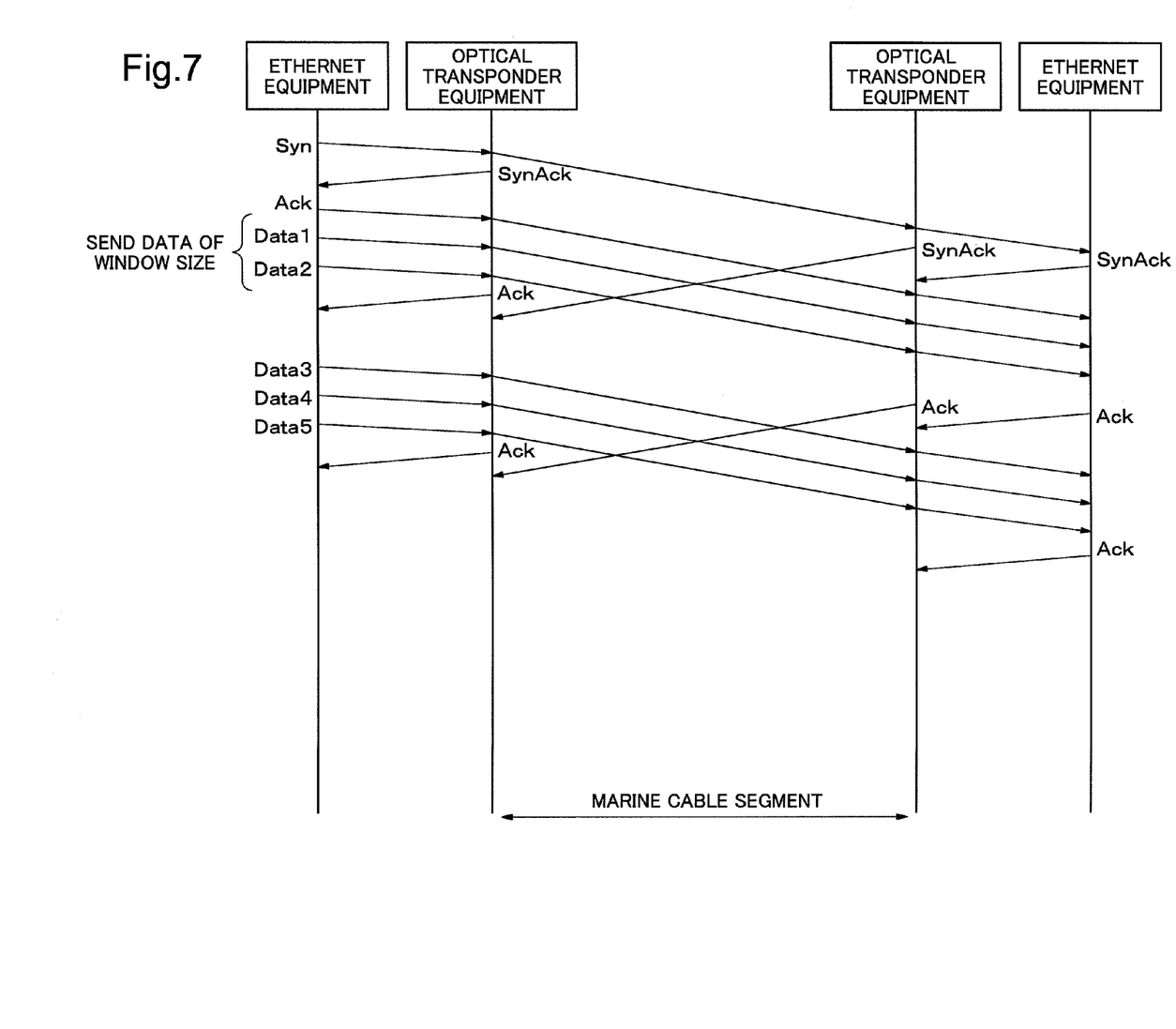
FIG. 7 is a figure showing an example of a packet sequence of connection establishment of TCP/IP communication in the embodiment of the present invention.
Figure 8:
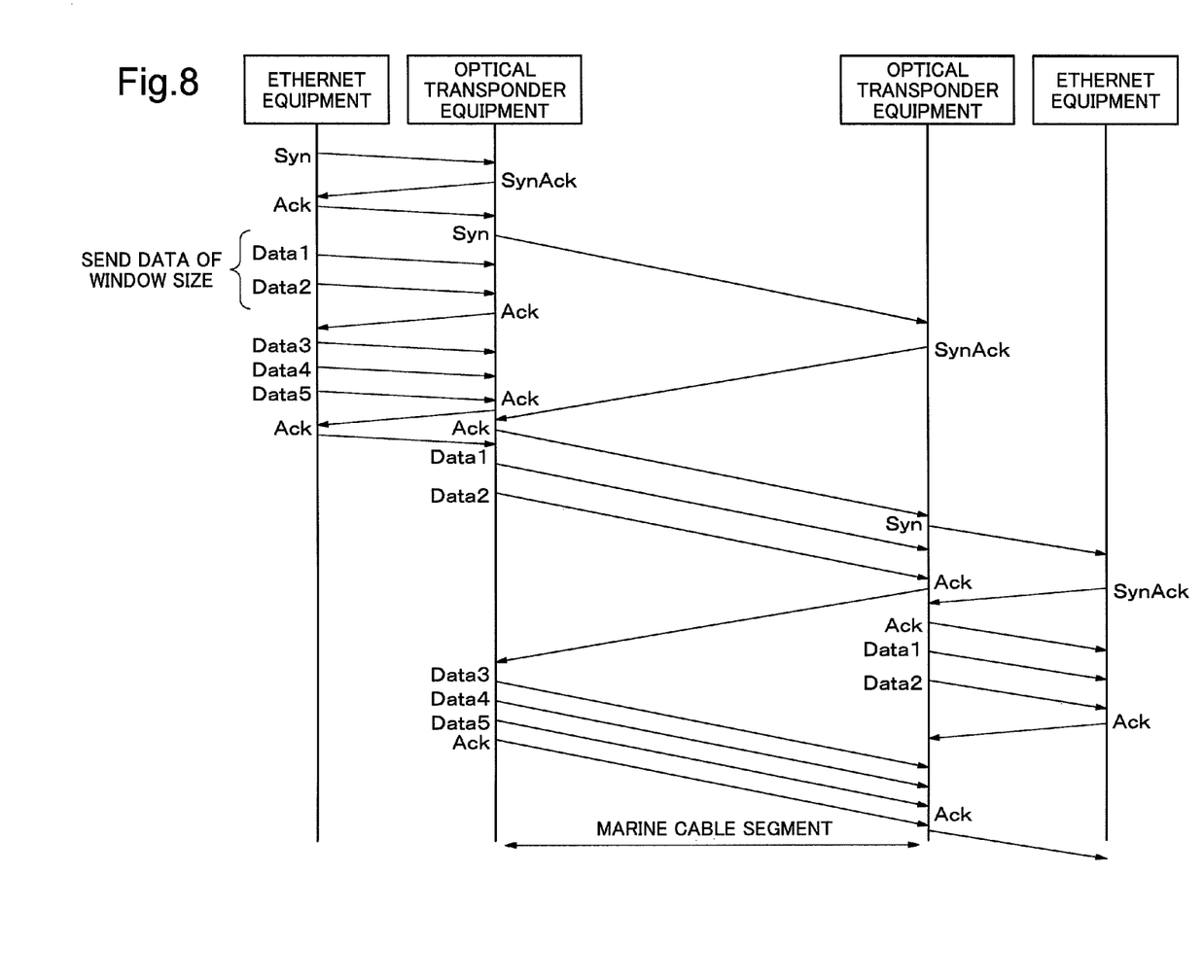
FIG. 8 is a figure showing another example of a packet sequence of connection establishment of TCP/IP communication in the embodiment of the present invention.

Also, it is possible to change handshaking method by TCP/IP as shown in FIG. 7 and FIG. 8. FIG. 7 is an example in which optical transponder equipment replies SYN/ACK to a SYN packet of TCP. Also, FIG. 8 is an example in which optical transponder equipment replies to SYN/ACK and waits until ACK which is a reply to the SYN/ACK is received, and after that, the protocol converter sends a SYN packet.

Next, the fourth embodiment of the present invention will be described with reference to FIGS. 3 and 4. In optical transponder equipment in this embodiment, the protocol converter 17 acquires a frame error rate of the circuit at the time of sending processing of TCP/IP and reflects it to the control of TCP.

That is, in an ocean cable segment, even if a bit error occurs, as far as it is within a range that can be restored by error correction by FEC, the error bit is restored and will not result in frame error occurrence consequently. However, for example, in case a state of a transmission line deteriorated extremely, and when occurrence of a bit error exceeds repair capability of the error correction function, a frame error occurs. Further, when frame errors occur beyond error repair capability of TCP, a packet loss will occur.

In the optical transponder equipment 8 on the receiving side, frame error occurrence is counted at the time when received FEC code is decoded, and the value is notified to the optical transponder equipment 7 on the sender side. Further, the frame error occurrence is detected, for example, by monitoring a code of 10 GBASE-R signal. Also, the monitoring units in both of the optical transponder equipment count the frame error occurrence and exchange the value.

The protocol converter 17 in the optical transponder equipment 7 refers to the frame error rate notified from the optical transponder equipment 8 via the monitoring unit 11. In case this frame error rate is not sufficiently small, the transmission characteristics of the marine cable segment are judged not to be good, sending data is stored temporarily until ACK arrival in preparation for occurrence of a packet loss, and the window size of sending of data is also restricted. On the other hand, in case the frame error rate is sufficiently small, it is judged that the transmission characteristics of the marine cable segment are good and a packet loss will not occur. And, in sending processing of TCP, data is not stored for re-sending of data, next data is sent continuously without waiting for ACK reception for the data sent, and the window size is set to maximum according to the reception capability of the opposite side equipment.

According to this embodiment, the occurrence probability of the packet loss is monitored by referring to the frame error rate which occurred actually. For this reason, in a circuit in which it is rare that the transmission characteristics deteriorate substantially, compared with a case where the bit error rate which is actually connected to a packet loss is low is referred to, it is possible to monitor the circuit state efficiently.

Further, the fifth embodiment of the present invention will be described. According to this embodiment, same as the second embodiment of the present invention mentioned above, the protocol converter 17 receives notification of the bit error rate which occurred in the marine cable and which is detected at the time of FEC decoding from the opposite optical transponder equipment, and reflects it to the control of TCP. However, according to the fifth embodiment, occurrence of a bit error is monitored based on whether it is within a range of error correcting capability by FEC as a standard, and as far as the bit error rate is within the range of the error correcting capability, the marine cable is handled as an error-free circuit actually. And, in case the bit error rate approaches a limit of the error correcting capability, it is determined that a possibility of frame error occurrence rises, controls are started in preparation for data loss occurrence.

According to this embodiment, before a frame error occurs, its probability of occurrence is detected. For this reason, compared with a case when a frame error which occurred actually is monitored, it is possible to perform communication control with less risk.

Further, in the embodiment of the present invention described above, the data loss occurrence probability which becomes a threshold for judging that a data loss does not occur is a parameter decided according to the needs of operation. For example, when the bit error rate is $10^{-15}$, it can be set as a value which is sufficiently small and with which a packet loss is assumed not to occur.

Figure 9:
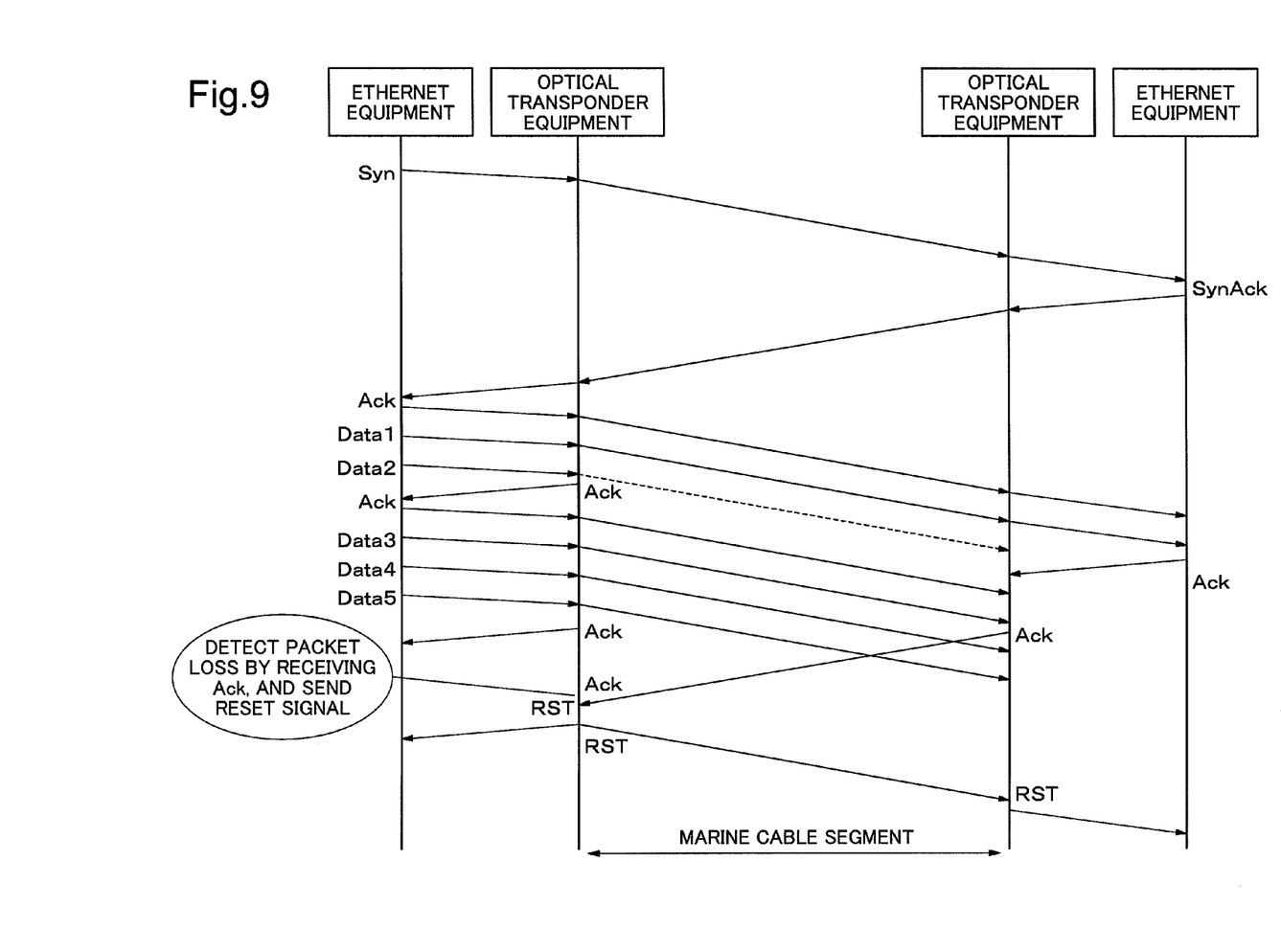
FIG. 9 is a sequence diagram showing an example to reset TCP connection in TCP/IP communication in the embodiment of the present invention.

Also, in preparation for a case when data of TCP connection of which the data was not stored is lost by any reasons, the protocol converter 17 may send a reset packet for resetting the TCP connection whose data is lost. Also, in the protocol converter 17, it is possible to reset TCP connection on a land network side which is related to the TCP connection whose data is lost. FIG. 9 is a sequence diagram showing an example which, in case data of TCP connection of which the data was not stored is lost by any reasons, the protocol converter 17 resets the TCP connection whose data is lost and the TCP connection on the land network side which is related to it.

Also, as for a bit error and a frame error, in order to improve accuracy of information, an example is possible for the monitoring unit 11 of two optical transponder equipment which hold a marine cable between them to exchange bit error and frame error information which each of them includes. If there exists discrepancy in information which both of optical transponder equipment have, a problem which is different from the state of the circuit, such as a failure of equipment on one side, can be detected.

Also, when the bit error rate or the frame error rate of the marine cable circuit are sufficiently low, an example is possible to send by UDP (User Datagram Protocol) in the marine cable circuit segment and to transfer data by TCP in the land network segment. Compared with TCP, even though UDP is inferior in reliability, its transfer rate is higher, and UDP can be used effectively in order to perform high-speed transmission in a circuit with no error occurrence.

Figure 10:
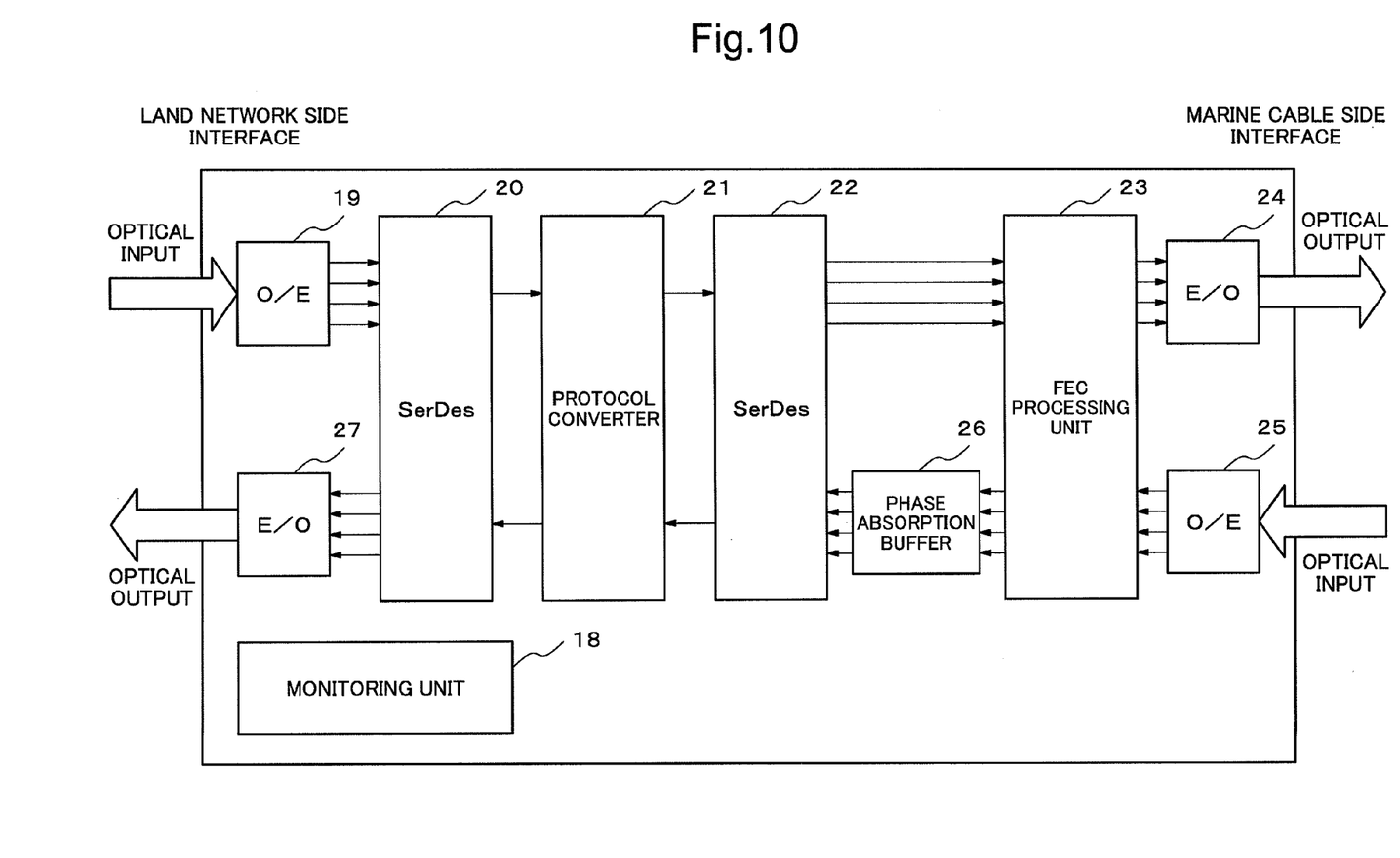
FIG. 10 is a block diagram showing an exemplary configuration of a case where 40 GbE interface (IEEE802.3ba) is used for land network side interface as optical transponder equipment using the present invention and a phase absorption buffer is installed.

FIG. 10 indicates, as the sixth embodiment of the present invention, an exemplary configuration of optical transponder equipment which adopted 40 GbE interface (IEEE802.3ba) as a land network side interface. Same as the embodiment of the present invention mentioned above, this optical transponder equipment includes a mechanism, in case the packet loss occurrence probability reaches a predetermined value, to change a set value of a data transfer segment size of the marine cable circuit and at the same time to change a volume of data stored temporarily. Because this embodiment transmits 40 GbE which multiplexes four waves of 10 Gbps signal over long-distance, and in this case, since phase difference appears to each wavelength component by a difference in optical path lengths or polarized wave dispersion, it is necessary to absorb the phase difference in a transponder receiving unit. Therefore, compared with a case where 10 G Ethernet signal is accommodated, as delay time in the equipment becomes even larger by the increase of latency, further effect of the present invention can be expected.

The structure of this optical transponder equipment is as follows. In FIG. 10, a monitoring unit 18 performs monitoring of warning detection state of the whole transponder equipment and warning transfer control. An O/E converter 19 accommodates 10 G Ethernet signal as a land network side interface. A SerDes 20 decodes 10.3 Gb/s×4 signal outputted from an O/E converter 25 and restores it into parallel signals. Also, parallel signals which a protocol converter 21 outputs is converted into a 40 GbE signal of 10.3 Gb/s×4 and outputted to the side of E/O converter 27. The protocol converter 21 includes a function to change a control parameter of a TCP/IP signal received from a land network side interface to a parameter suitable for a marine cable system and to make it an extended TCP/IP frame; and also to convert an extend TCP/IP frame received from the marine cable side interface into a usual TCP/IP frame, and to output it to the land network side interface. A SerDes 22 converts parallel signals outputted from the protocol converter 21 into a 40 GbE signal of 10.3 Gb/s×4 and delivers it to an FEC processing unit 23. Also, parallel signals are restored from a 40 GbE signal outputted from a phase difference absorption buffer 26. Further, the FEC processing unit 23 includes an FEC coding/decoding function, performs FEC coding of the 40 GbE signal inputted from the land network side and sends it to the marine cable side. Also, an FEC code signal inputted from the marine cable side is decoded, and the decoded 40 GbE signal is sent to the land network side. An E/O converter 24 performs electric-optical conversion to the electric signal inputted from the FEC processing unit 23, and outputs it as an optical signal. An O/E converter 25 performs optical-electric conversion to an optical signal inputted from outside, and sends it to the FEC processing unit 23. The phase absorption buffer 26 absorbs a phase difference of each wavelength of 40 GbE produced by signal transmission in the marine cable segment. The E/O converter 27 performs electric-optical conversion to the electric signal inputted from the SerDes 20, and outputs it as an optical signal.

According to this embodiment, the present invention is applied to a 40 GbE transmission system. In a 40 GbE transmission system, latency is very large compared with a 10 GbE transmission system. For this reason, it is usually necessary to secure a large amount of data storage area for storing sending data temporarily. However, by applying the present invention, it becomes unnecessary to secure such a data storage area. Also, applying the present invention to a 40 GbE transmission system with large latency can show a large effect in particular to the throughput improvement of data transmission.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2009-218752, filed on Sep. 24, 2009, the disclosure of which is incorporated herein in its entirety by reference.

DESCRIPTION OF CODES

1 Communication data transmission equipment
2 Long-distance optical fiber circuit
3 Data sending and receiving mechanism
4 Control unit
5 Circuit status monitoring mechanism
6 Data storage equipment
7, 8 Optical transponder equipment
9, 10 Ethernet equipment
11 Monitoring unit
12 XFP (10 Gigabit Small Form-factor Pluggable) transceiver
13 SerDes (Serializer/Deserializer)
14 FEC processing unit
15 E/O converter
16 O/E converter
17 Protocol converter
18 Monitoring unit
19 O/E converter
20 SerDes (Serializer/Deserializer)
21 Protocol converter
22 SerDes (Serializer/Deserializer)
23 FEC processing unit
24 E/O converter
25 O/E converter
26 Phase absorption buffer
27 E/O converter

The invention claimed is:

1. A communication data transmission equipment which performs sending and receiving of data with opposite transmission equipment connected via a long-distance optical fiber circuit, comprising:

a data sending and receiving unit which, after sending a connection establishment request to said opposite transmission equipment, sends data before arrival of an acknowledgement reply;

a circuit state monitoring unit which estimates data loss occurrence probability from data loss occurrence state in sending and receiving of data with said opposite transmission equipment or acquires data loss occurrence probability which said opposite transmission equipment estimated; and a unit performing controls which, until said data loss occurrence probability exceeds a predetermined value, do not restrict a data size per each sending of data, and in case said data loss occurrence probability exceeds the predetermined value, reduce the data size per each sending of data according to an increase of the data loss occurrence probability.

2. The communication data transmission equipment according to claim 1, further comprising a unit which, until said data loss occurrence probability exceeds the predetermined value, does not store contents of the data sent, and in case said data loss occurrence probability exceeds the predetermined value, stores the contents of the data sent.

3. The communication data transmission equipment according to claim 1, wherein said data loss occurrence probability is estimated based on a detected value of a bit error or a frame error which occurred in said long-distance optical fiber circuit.

4. The communication data transmission equipment according to claim 3, further comprising:
   a unit which performs error correction of the data sent via said long-distance optical fiber circuit; and
   a unit which detects an occurrence rate of a bit error when performing said error correction; wherein
   estimation of said data loss occurrence probability is performed based on the detected value of said bit error.

5. The communication data transmission equipment according to claim 3, further comprising:
   a unit which performs error correction of the data sent via said long-distance optical fiber circuit; and
   a unit which detects an occurrence rate of a frame error after performing said error correction; wherein
   estimation of said data loss occurrence probability is performed based on the detected value of said frame error.

6. The communication data transmission equipment according to claim 1, further comprising a unit which, in case sent data is not stored and further, also lost by occurrence of a data loss in said long-distance optical fiber circuit, resets connection between said communication data transmission equipment.

7. The communication data transmission equipment according to claim 1, further comprising a unit which, when data transfer between communication terminals belonging to different communication networks respectively is performed via said long-distance optical fiber circuit, relays data transfer between said communication terminals respectively, and when relaying the data transfer, converts a communication protocol of the data transfer.

8. The communication data transmission equipment according to claim 7, wherein, in case a data loss occurred on a route between said communication terminal on a sending side and said communication data transmission equipment on a side of the communication terminal, a route between said communication terminal on a receiving side and said communication data transmission equipment on a side of the communication terminal, and a route in said long-distance optical fiber circuit, said data sending and receiving unit resends data by a communication protocol on the respective routes.

9. The communication data transmission equipment according to claim 7, further comprising a unit which, on a route between said communication terminal on a sending side and said communication data transmission equipment on a side of the communication terminal, on a route between said communication terminal on a receiving side and said communication data transmission equipment on a side of the communication terminal, and on a route in said long-distance optical fiber circuit, controls a data size per each sending of data independently by the communication protocol on the respective routes.

10. The communication data transmission equipment according to claim 7, further comprising a unit which, in case sent data is not stored and further, also lost by occurrence of a data loss in said long-distance optical fiber circuit, resets connection between said communication terminal which sent the data and said communication data transmission equipment on a side of the communication terminal and connection between said communication terminal which was to receive the data and said communication data transmission equipment on a side of the communication terminal.

11. The communication data transmission equipment according to claim 1, wherein said communication terminal and said communication data transmission equipment includes a sending and receiving function of TCP, said communication data transmission equipment further comprising:
   a unit which receives a TCP/IP packet sent from said communication terminal or said communication data transmission equipment on the opposite side, and replies an acknowledgement reply of TCP for the TCP/IP packet to a sending source of the TCP/IP packet;
   a unit which relays said TCP/IP packet received, and transfers it to said communication terminal or said communication data transmission equipment on the opposite side; and
   a unit which receives an acknowledgement reply of TCP from a transfer destination for said TCP/IP packet transferred, and terminates a session.

12. The communication data transmission equipment according to claim 11, further comprising a unit which, in case said data loss occurrence probability does not exceed the predetermined value, changes the communication protocol in said long-distance optical fiber circuit to UDP.

13. A communication data transmission system, comprising first communication data transmission equipment and second communication data transmission equipment connected via a long-distance optical fiber circuit; wherein
   said first communication data transmission equipment and said second communication data transmission equipment comprise communication data transmission equipment according to claim 1.

14. A communication data transmission method of communication data transmission equipment which performs sending and receiving of data via a long-distance optical fiber circuit, said method comprising the steps of:
   sending, by a first data sending and receiving mechanism, data before arrival of an acknowledgement reply, after sending a connection establishment request to opposite transmission equipment;
   acquiring, by a circuit state monitor, data loss occurrence probability by estimating from data loss occurrence state in sending and receiving of data or by obtaining from said opposite transmission equipment; and
   performing, by a first controller, control not to restrict a data size per each sending of data until said data loss occurrence probability exceeds a predetermined value, and to reduce the data size per each sending of data according to an increase of the data loss occurrence probability in case said data loss occurrence probability exceeds the predetermined value.

15. The communication data transmission method according to claim 14, further comprising a step of, until said data loss occurrence probability exceeds the predetermined value, storing no contents of the data sent, and in case said data loss occurrence probability exceeds the predetermined value, storing, by a data storage equipment, the contents of the data sent.

16. The communication data transmission method according to claim 14, wherein said data loss occurrence probability is estimated based on a detected value of a bit error or a frame error which occurred in said long-distance optical fiber circuit.

17. The communication data transmission method according to claim 16, further comprising steps of:
performing, by a processor, error correction of the data sent via said long-distance optical fiber circuit; and
detecting an occurrence rate of a bit error when performing said error correction; wherein
estimation of said data loss occurrence probability is performed based on the detected value of said bit error.

18. The communication data transmission method according to claim 16, further comprising steps of:
performing, by a processor, error correction of the data sent via said long-distance optical fiber circuit; and
detecting, by an optical transponder, an occurrence rate of a frame error after performing said error correction; wherein
estimation of said data loss occurrence probability is performed based on the detected value of said frame error.

19. The communication data transmission method according to claim 14, further comprising a step of resetting, by a protocol converter, connection between said communication data transmission equipment in case sent data is not stored and further, also lost by occurrence of a data loss in said long-distance optical fiber circuit.

20. The communication data transmission method according to claim 14, further comprising steps of:
relaying, by a relay transceiver, data transfer between communication terminals respectively when data transfer between said communication terminals belonging to different communication networks is performed via said long-distance optical fiber circuit; and
converting, by a protocol converter, a communication protocol of the data transfer when said relaying the data transfer is performed.

21. The communication data transmission method according to claim 20, wherein said communication terminal and said communication data transmission equipment includes a sending and receiving function of TCP, said method further comprising steps of:
receiving by a second data sending and receiving mechanism, a TCP/IP packet sent from said communication terminal or said communication data transmission equipment on the opposite side, and replying an acknowledgement reply of TCP for the TCP/IP packet to a sending source of the TCP/IP packet;
relaying, by the relay transceiver, said TCP/IP packet received, and transferring it to said communication terminal or said communication data transmission equipment on the opposite side; and
receiving by the first data sending and receiving mechanism, an acknowledgement reply of TCP from a transfer destination for said TCP/IP packet transferred, and terminating a session.

22. The communication data transmission method according to claim 21, further comprising a step of changing, by the protocol converter, the communication protocol in said long-distance optical fiber circuit to UDP in case said data loss occurrence probability does not exceed the predetermined value.

23. The communication data transmission method according to claim 20, further comprising a step of, in case a data loss occurs on a route between said communication terminal on a sending side and said communication data transmission equipment on a side of the communication terminal, a route between said communication terminal on a receiving side and said communication data transmission equipment on a side of the communication terminal, and a route in said long-distance optical fiber circuit, resending by at least one from among the first data sending and receiving mechanism and a second data sending and receiving mechanism, data by a communication protocol on the respective routes.

24. The communication data transmission method according to claim 20, further comprising a step of, on a route between said communication terminal on a sending side and said communication data transmission equipment on a side of the communication terminal, on a route between said communication terminal on a receiving side and said communication data transmission equipment on a side of the communication terminal, and on a route in said long-distance optical fiber circuit, controlling, by at least one from among the first controller and a second controller, a data size per each sending of data independently by the communication protocol on the respective routes.

25. The communication data transmission method according to claim 20, further comprising a step of resetting, by the protocol converter, connection between said communication terminal which sent the data and said communication data transmission equipment on a side of the communication terminal and connection between said communication terminal which was to receive the data and said communication data transmission equipment on a side of the communication terminal, in case sent data is not stored and further, also lost by occurrence of a data loss in said long-distance optical fiber circuit.

26. A non-transitory program recording medium recording a communication data transmission program for a communication data transmission equipment which sends and receives data to and from opposite transmission equipment connected via a long-distance optical fiber circuit, said program comprising procedures of:
sending data before arrival of an acknowledgement reply procedure, after sending a connection establishment request to said opposite transmission equipment;
acquiring data loss occurrence probability by estimating from data loss occurrence state in sending and receiving of data or by obtaining from said opposite transmission equipment; and
performing control not to restrict a data size per each sending of data until said data loss occurrence probability exceeds a predetermined value, and to reduce the data size per each sending of data according to an increase of the data loss occurrence probability in case said data loss occurrence probability exceeds the predetermined value.

27. The non-transitory program recording medium according to claim 26, wherein said program further comprises a procedure of storing no contents of the data sent until said data loss occurrence probability exceeds the predetermined value, and storing the contents of the data sent in case said data loss occurrence probability exceeds the predetermined value.

28. The non-transitory program recording medium according to claim 26, wherein said data loss occurrence probability is estimated based on a detected value of a bit error or a frame error which occurred in said long-distance optical fiber circuit.

29. The non-transitory program recording medium according to claim 28, wherein said program further comprises procedures of:
performing error correction of the data sent via said long-distance optical fiber circuit; and
detecting an occurrence rate of a bit error when performing said error correction; wherein
estimation of said data loss occurrence probability is performed based on the detected value of said bit error.

30. The non-transitory program recording medium according to claim 28, wherein said program further comprises procedures of:
performing error correction of the data sent via said long-distance optical fiber circuit; and
detecting an occurrence rate of a frame error after performing said error correction; wherein
estimation of said data loss occurrence probability is performed based on the detected value of said frame error.

31. The non-transitory program recording medium according to claim 26, wherein said program further comprises a procedure of resetting connection between said communication data transmission equipment in case sent data is not stored and further, also lost by occurrence of a data loss in said long-distance optical fiber circuit.

32. The non-transitory program recording medium according to claim 26, wherein said program further comprises a procedure of relaying data transfer between said communication terminals respectively when data transfer between communication terminals belonging to different communication networks respectively is performed via said long-distance optical fiber circuit, and converting a communication protocol of the data transfer when said relaying the data transfer is performed.

33. The non-transitory program recording medium according to claim 32, wherein said program further comprises procedures of:
receiving a TCP/IP packet sent from said communication terminal or said communication data transmission equipment on the opposite side including a sending and receiving function of TCP, and replying an acknowledgement reply of TCP for the TCP/IP packet to a sending source of the TCP/IP packet;
relaying said TCP/IP packet received, and transferring it to said communication terminal or said communication data transmission equipment on the opposite side; and
receiving an acknowledgement reply of TCP from a transfer destination for said TCP/IP packet transferred, and terminating a session.

34. The non-transitory program recording medium according to claim 33, wherein said program further comprises a procedure of changing the communication protocol in said long-distance optical fiber circuit to UDP in case said data loss occurrence probability does not exceed the predetermined value.

35. The non-transitory program recording medium according to claim 32, wherein said program further comprises a procedure of, in case a data loss occurred on a route between said communication terminal on a sending side and said communication data transmission equipment on a side of the communication terminal, a route between said communication terminal on a receiving side and said communication data transmission equipment on a side of the communication terminal, and a route in said long-distance optical fiber circuit, resending data by a communication protocol on the respective routes.

36. The non-transitory program recording medium according to claim 32, wherein said program further comprises a procedure of, on a route between said communication terminal on a sending side and said communication data transmission equipment on a side of the communication terminal, on a route between said communication terminal on a receiving side and said communication data transmission equipment on a side of the communication terminal, and on a route in said long-distance optical fiber circuit, controlling a data size per each sending of data independently by the communication protocol on the respective routes.

37. The non-transitory program recording medium according to claim 32, wherein said program further comprises a procedure of resetting connection between said communication terminal which sent the data and said communication data transmission equipment on a side of the communication terminal and connection between said communication terminal which was to receive the data and said communication data transmission equipment on a side of the communication terminal in case sending data is not stored and further, also lost by occurrence of a data loss in said long-distance optical fiber circuit.

* * * * *